Nov. 2, 1954   M. W. HILD, JR   2,693,327
AERIAL SUPPLY PROJECTILE BRAKE MECHANISM
Filed April 6, 1951   5 Sheets-Sheet 1
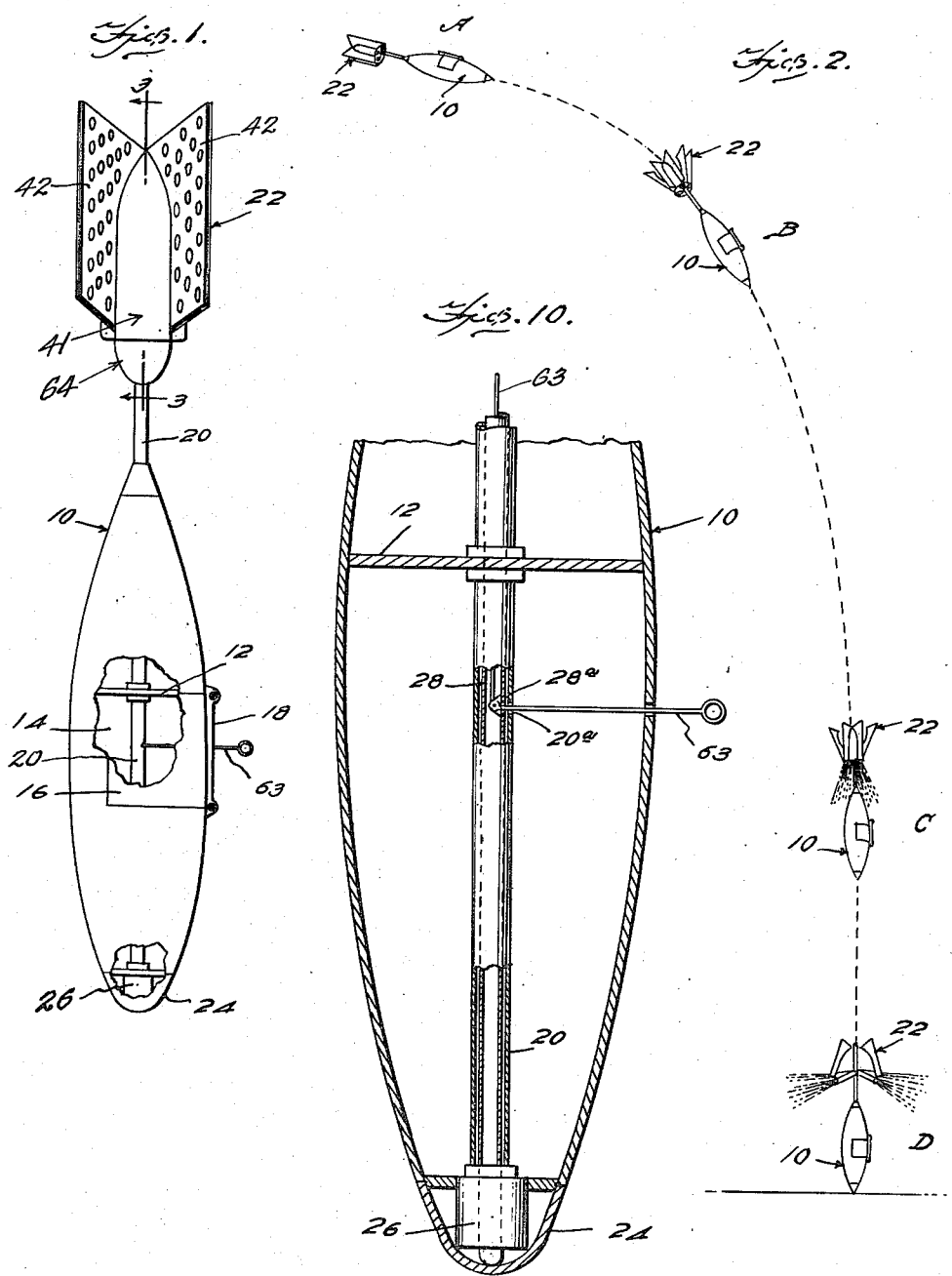
INVENTOR.
Mark W. Hild, Jr.
BY
Wilfred E. Lawson
ATTORNEY

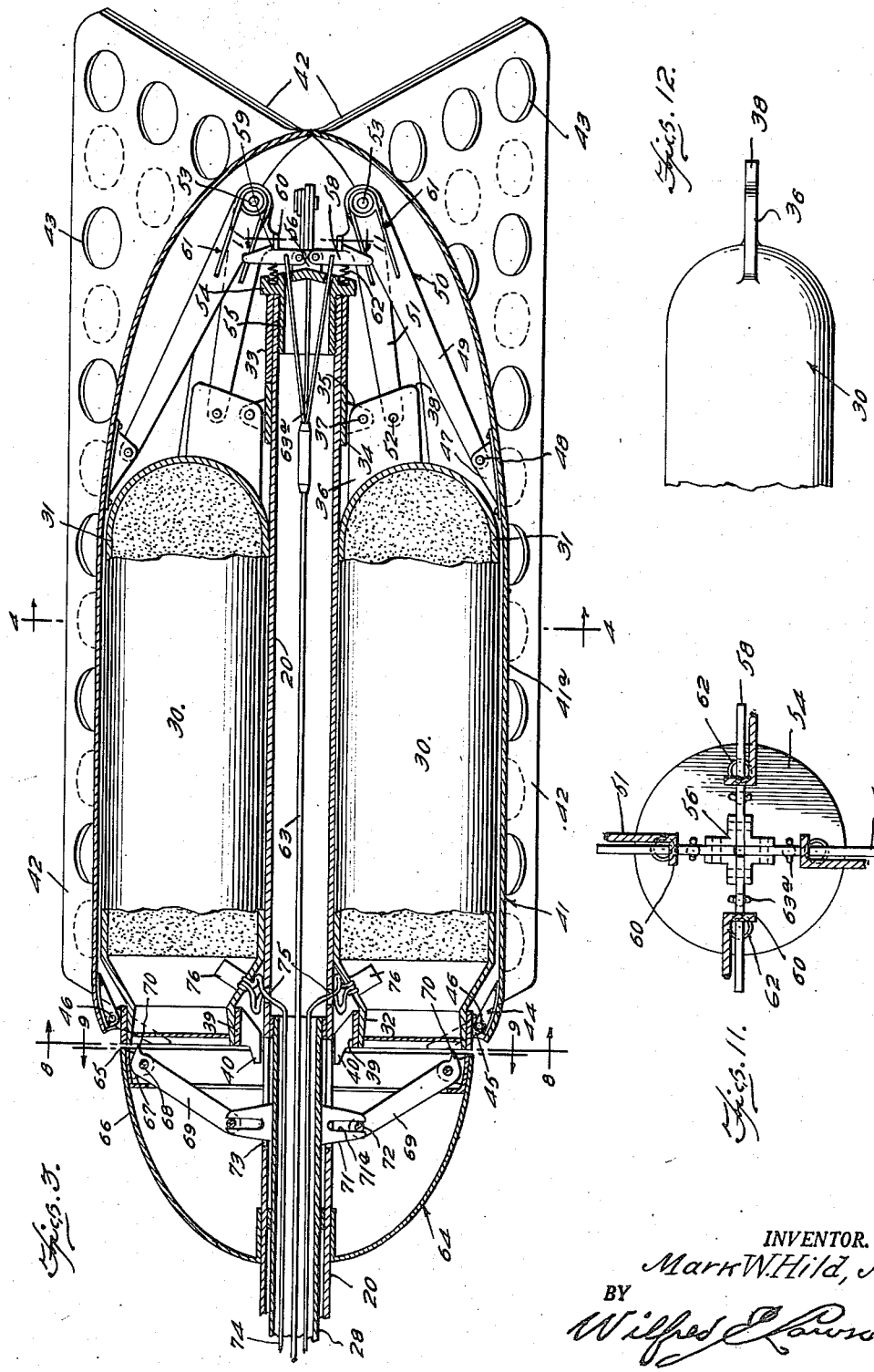

Nov. 2, 1954  M. W. HILD, JR  2,693,327
AERIAL SUPPLY PROJECTILE BRAKE MECHANISM
Filed April 6, 1951  5 Sheets-Sheet 3

INVENTOR.
Mark W. Hild, Jr.
BY
Wilfred Lawson
ATTORNEY

Nov. 2, 1954   M. W. HILD, JR   2,693,327
AERIAL SUPPLY PROJECTILE BRAKE MECHANISM
Filed April 6, 1951   5 Sheets-Sheet 4
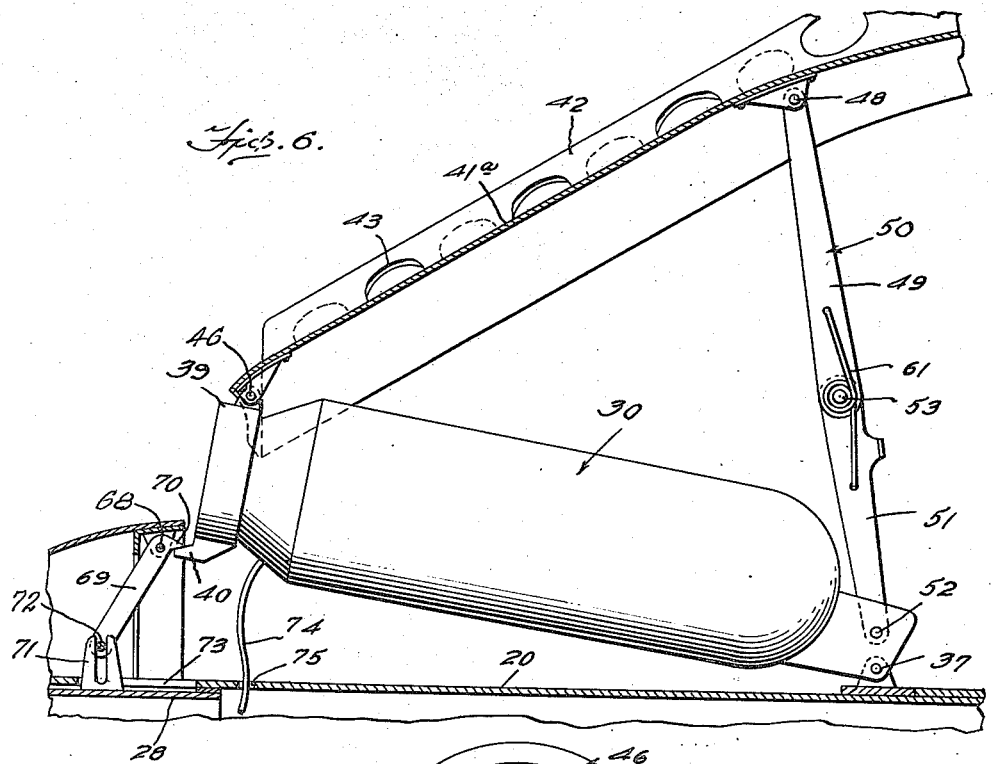
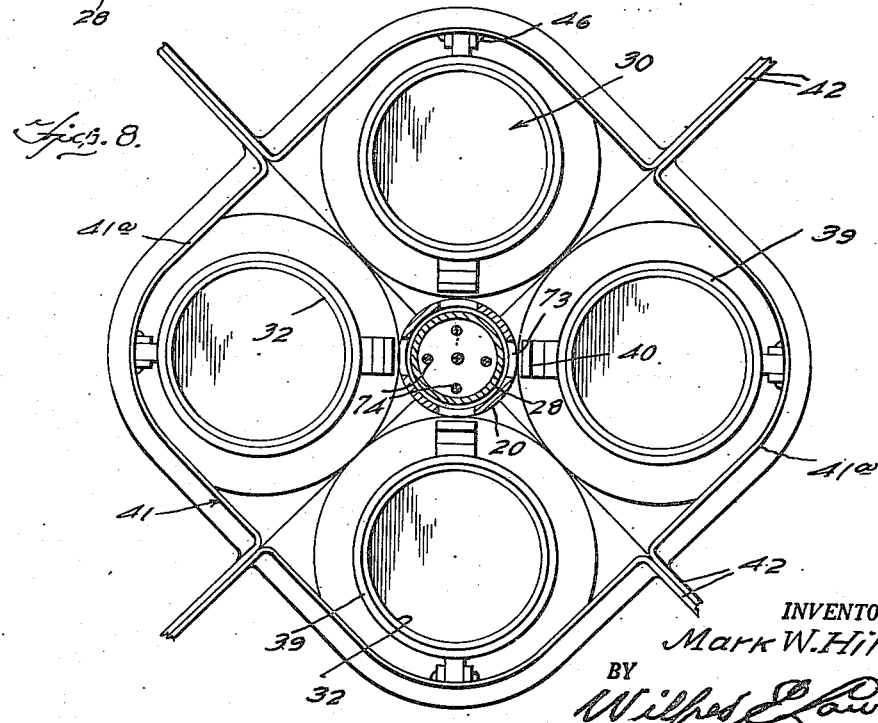
INVENTOR.
Mark W. Hild, Jr.
BY
Wilfred E. Lawson
ATTORNEY

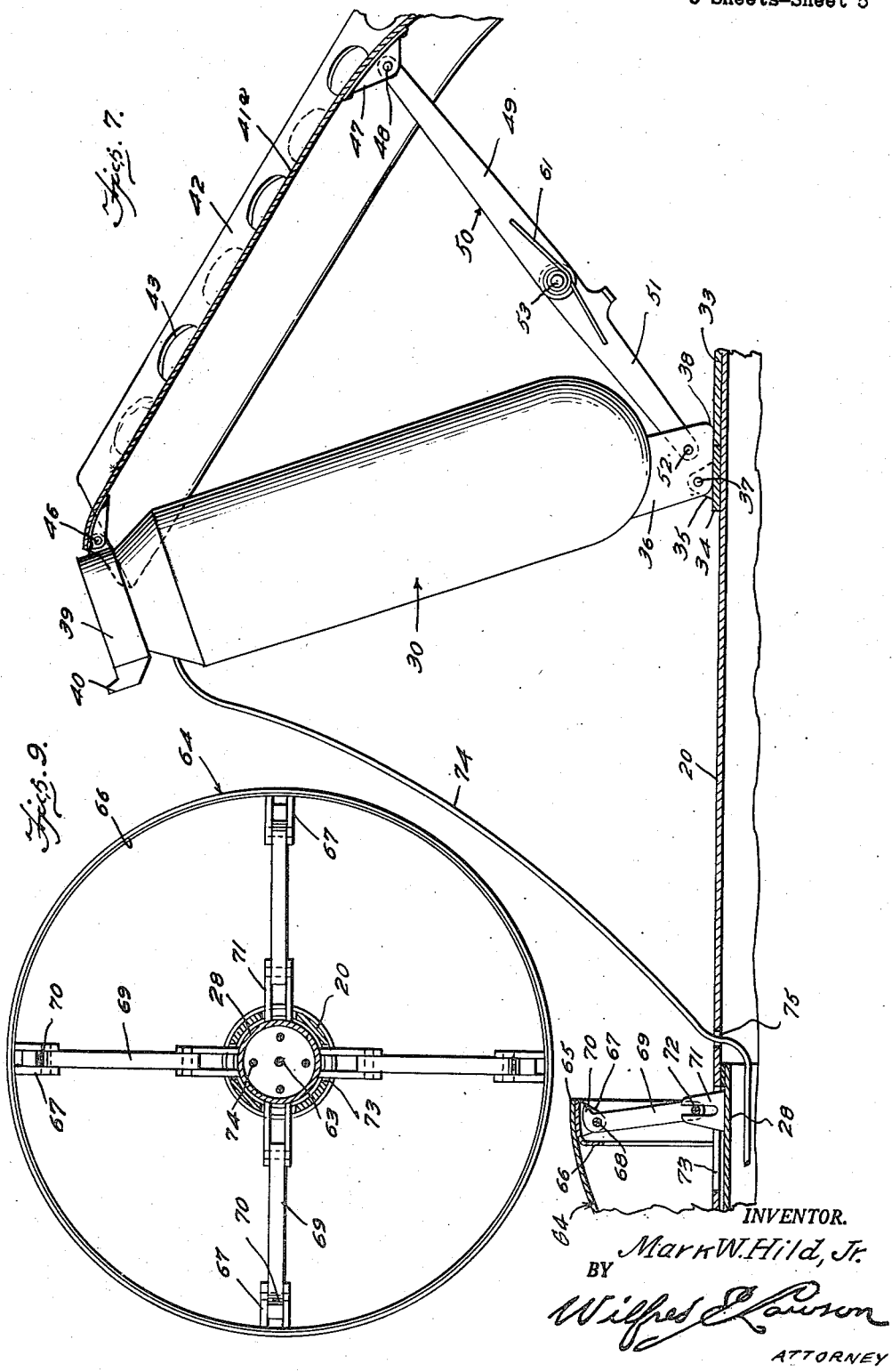

United States Patent Office 2,693,327
Patented Nov. 2, 1954

2,693,327

AERIAL SUPPLY PROJECTILE BRAKE MECHANISM

Mark W. Hild, Jr., Los Angeles, Calif., assignor to Mutual Corporation, Los Angeles, Calif., a corporation of California Application April 6, 1951, Serial No. 219,663

11 Claims. (Cl. 244—138)

This invention relates to improvements in aerial supply projectiles of a type to be released at high altitudes for delivering a load of material to the earth, which material may be of a military character or in the form of rescue and life saving supplies.

An object of the present invention is to provide an aerial supply projectile for dropping supplies or other materials from a high altitude, wherein novel means is employed for checking the projectile speed as it approaches the ground, whereby to deliver the load without damage.

Another object of the invention is to provide a method of dropping supplies, or other material, by a means which possesses a minimum of vulnerability to enemy action and to the effects of wind currents.

A still further object of the invention is to provide an apparatus for dropping a load from a high altitude, wherein such apparatus is provided with aerodynamic control and drag means in the form of movable tail fins, whereby a preliminary retarding of the descent is effected immediately following the release of the apparatus from the carrying aircraft, and wherein the apparatus is provided with additional means to further retard or decrease the speed of descent comprising forwardly discharging jet engines or rockets which come into action at a predetermined distance above the ground, whereby ground contact is made at a relatively slow speed.

Still another object of the invention is to provide in an apparatus of the above described character, a means which becomes effective on contact with the apparatus with the ground to maintain the load carrier against movement from the place where it lands.

Still another object of the invention is to provide in an apparatus of the above described character, a means whereby the rocket jet units become automatically released upon the contact of the apparatus with the ground for movement to a position where they will discharge laterally with respect to the apparatus, in the event that the fuel of the jets has not been exhausted, so as to protect the apparatus from damage and also to prevent undesired movement of the apparatus from the place where it has landed.

Another object of the invention is to provide a load carrying vehicle of the character stated, designed and aerodynamically controlled in such a manner as to make possible the placement of the load on the ground with the same degree of accuracy as is possible with the dropping of a bomb or similar device.

Still another object of the invention is to provide a load dropping vehicle of the character stated, which can be economically constructed and which can be dropped from any altitude above several thousand feet and slowed to a negligible velocity at ground impact by rocket thrust.

A further and more specific object of the invention is to provide a load dropping vehicle of the character above set forth, employing rocket thrust means for slowing the speed of the vehicle as it approaches the ground, which thrust means is activated at the desired altitude by a proximity fuse carried in the leading end of the vehicle.

Other objects and advantages of the invention will become apparent as the description of the same proceeds and the invention will be best understood from a consideration of the following detailed description taken in connection with the acompanying drawings forming a part of the specification, with the understanding, however, that the invention is not to be limited to the exact details of construction shown and described since obvious modifications will occur to a person skilled in the art.

In the drawings:

Figure 1 is a view in side elevation of a rocket arrested supply projectile constructed in accordance with a preferred embodiment of the invention, parts of the load carrying receptacle being broken away.

Figure 2 is a diagrammatic view illustrating the positions of the arresting mechanism at different elevations of the projectile.

Figure 3 is a longitudinal sectional view through the arresting mechanism at the rear end of the structure, taken substantially on the line 3—3 of Figure 1 and on an enlarged scale, the air brakes or fins and housing sections thereof being in closed position.

Figure 6 is a fragmentary detail corresponding to Figure 5 but showing the second position of the fins and rockets, where the rocket is arrested at its first outwardly swung position corresponding to the position shown at B in Figure 2.

Figure 7 is a fragmentary detail showing the third and final position of opening for the fins and rockets, which position is assumed after the projectile strikes the ground whereby the rocket is released to swing the limit of its movement outwardly with respect to the longitudinal axis of the projectile, this position corresponding to the diagrammatically illustrated position at D in Figure 2.

Figure 8 is a transverse sectional view taken substantially on the line 8—8 of Figure 3.

Figure 9 is a transverse sectional view taken substantially on the line 9—9 of Figure 3.

Figure 10 is a longitudinal section through the forward end of the cargo carrying receptacle showing details of construction.

Figure 11 is a transverse section taken substantially on the line 11—11 of Figure 3.

Figure 12 is a detail view of the rear end of one rocket showing an edge view of the hinge blade.

Figure 5:
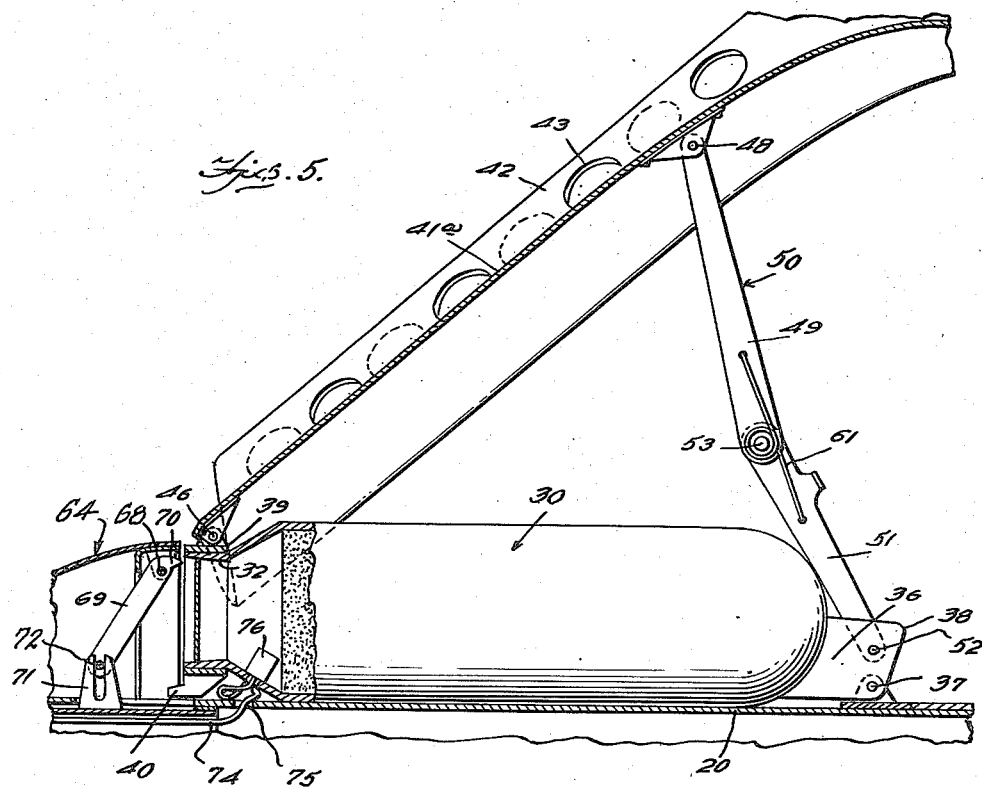
Figure 5 is a fragmentary detail illustrating the position of one fin and a portion of the attached housing section at the first opening stage of the fins or air brakes and before the rockets are shifted outwardly.

Referring now more particularly to the drawings the numeral 10 generally designates a cargo carrying body or vehicle of a preferred form and constructed in accordance with the present invention.

As shown the preferred form of the cargo carrying receptacle is in resemblance of a wing tank. Such receptacle may be constructed of any suitable material, preference being had for a shell of plastic and fiberglass laminations. Such a medium for a structure of this kind is inexpensive and has all of the structural capabilities of aluminum, except in direct tension and also the use of plastic will reduce the tendency of the shell to "oil can" and induce flutter.

It is contemplated to provide the receptacle with silicone coatings in view of the proximity of the hereinafter described rockets which are connected with the receptacle so that the receptacle will be suitably protected from the heat of the rocket blast to withstand temperatures of at least one thousand degrees F. for a short period.

In Figure 1 of the drawing the body structure 10 is shown broken away and as is disclosed by the broken away portions, there is a bulk head 12 dividing the interior of the body rearwardly of the transverse center providing a cargo compartment 14 to which access is had by a suitable door 16.

The side wall of the vehicle body has secured thereto the attaching fitting 18 of a type commonly employed for mounting bombs in an airplane by means of standard bomb release mechanism, not here shown, which mechanism might be conveniently employed for carrying and effecting the release of the vehicle at the proper moment by the airplane pilot.

Extending longitudinally through the vehicle body 10 is a tension tube 20, to the rear end of which is secured in the manner about to be described, the combined drag fin assembly and rocket structure which is generally designated 22.

The tube 20 passes entirely through the center of the vehicle body 10 and is connected in the nose cap 24 with a ground proximity fuse which is generally designated 26.

No detailed illustration or description of this fuse mechanism is herein set forth since the construction and operation of such fuses in the various types which are available, are well known. Such fuse would be provided to supply the necessary electrical impulse, which would be approximately six volts, for firing the hereinafter described rockets at about 1025 feet altitude.

Extending through and having limited sliding movement within the tension tube 20 is a tube 28, the forward end of which would be located within the nose cap whereby upon the contacting of the nose caps with the ground a slight rearward thrust will be imparted to the tube 28 for actuating mechanism forming a part of the drag fin assembly.

Secured to the tension tube 20 at the rear end thereof are a number of rockets, preferably four, as here shown, each of which rockets is designated 30. Each rocket comprises a long cylindrical shell 31 which lies against and is secured to the tube 20 as shown in Figure 3. The discharge end of each rocket is in the form of a reduced or constricted nozzle 32 and, as shown, the rockets are placed around the tube 20 so that, until they are set off or ignited by the proximity fuse, they lie parallel with the tube and have their discharge nozzles directed forwardly or in the direction of travel of the body 10 in its descent.

The rear end of the tube 20 is enclosed in a sleeve 33 and forwardly of this sleeve the tube has fitted therearound a collar 34 which carries four pairs of outwardly projecting hinge ears 35. The rockets 30 are positioned forwardly of the hinge ears 35 and each rocket carries a rearwardly projecting hinge blade 36 which lies at the side of the longitudinal center of the rocket nearest to the tube 20 and extends rearwardly between a pair of ears 35 to which it is pivotally connected by a pin 37. The rocket is thus supported by the pin 37 so that its forward or nozzle end can swing outwardly away from the tube 20 and this swinging movement is limited by the engagement of the heel portion 38 of the blade with the sleeve 33.

The nozzle portion 32 of each rocket has secured therearound the collar band 39 from which extends forwardly, at the inner side of the band or, in other words, that side nearest to the tube 20, a stop finger 40, the purpose of which will be hereinafter set forth.

Enclosing the rockets 30 is the long shell which is generally designated 41 and which is divided lengthwise into the four sections 41a. This shell is drawn off at its rear end or tapered to a streamline form so as to completely enclose or cover the rear ends of the rockets.

Figure 4:
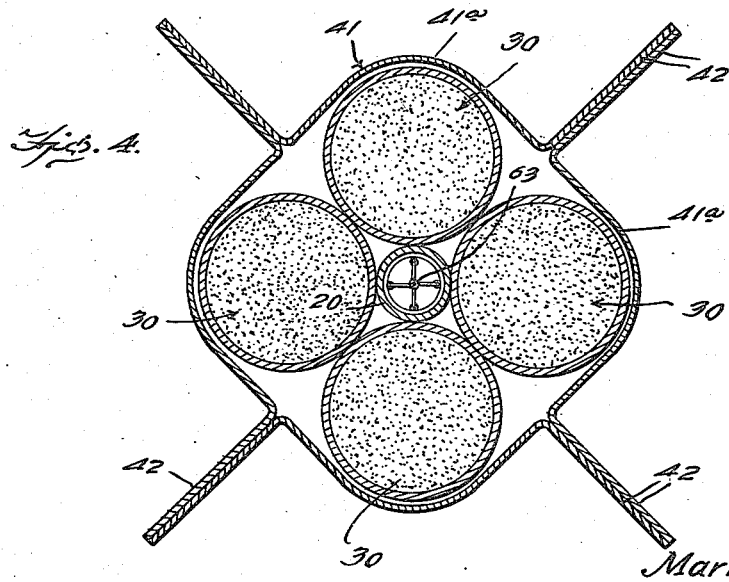
Figure 4 is a transverse sectional view taken substantially on the line 4—4 of Figure 3.

Each of the four sections 41a of the shell 41 is bordered by the longitudinally outwardly projecting fin 42 which follows the edge of the shell section entirely to the rear end thereof. When the shell sections 41a are in parallel adjoining or closed relation the two fins of each section will each be against or in contacting relation with a fin of an adjacent section as shown in Figure 4.

The fins 42 are perforated as indicated at 43 whereby to prevent instability such as might result from the projection into the slip stream of a solid plate where the air would tend to burble from the plate. When the sections 41a of the housing shell are closed together the openings 43 of contacting or mating fins 42 will be out of register with one another so as to eliminate drag when the housing shell is closed.

At the forward edge of each section 41a of the housing shell 41 the shell section carries an inwardly extending hinge ear 44 which mates with an adjacent corresponding ear 45 carried by the adjacent collar band 39 and these ears are pivotally coupled together by the pivot pin 46, the axis of which is perpendicular to the longitudinal axis of the housing shell. Thus the shell portions or sections 41a when swung outwardly on their pivot pins 46, will extend in four directions from the tension tube 20, as will be readily apparent.

In the rear end portion of each housing shell section 41a the section carries on its inner surface, adjacent to the rear end of a rocket 30, an inwardly extending hinge ear 47 with which is pivotally connected by the pin 48 an end of a link 49 which forms the outer half of a two-part articulated arm which is generally designated 50. The numeral 51 designates the inner link part of the arm which is pivotally connected at one end by the pin 52 with the adjacent hinge blade 36. The other ends of the links forming the arm 50 are pivotally coupled together by the pin 53 and as shown when the housing sections are closed together the articulated arm will also be closed with the hinge joints, represented by the pins 53, extending rearwardly beyond the adjacent end of the tube 20.

The rear end of the tube 20 is closed by a head cap 54 which is here shown as having a tubular extension 55 which is threaded in the end of the tube 20. On the central outer side of the cap is a stud 56 to which are pivotally connected on pivot pins 57, the four latch elements 58. Each of the latch elements has a bill 59 which engages behind a keeper flange 60 carried by the adjacent arm link 51, whereby the arms are held in folded position as illustrated to maintain the sections of the housing shell together, against the arm extending action of springs 61, each of which has a portion encircling the arm pivot 53 and two end portions each of which is connected with an arm link 49—51 as illustrated. It will thus be seen that when the arms are folded the springs 61 are under tension and when the latches 58 are shifted toward the cap 54 they will release the keepers and permit the springs to straighten the arms out thereby causing the housing shell sections or portions 41a to swing outwardly on the pivots 46.

In order to ensure the maintenance of the latch elements 58 in connection with the keepers 60, each latch element has interposed between it and the cap 54, an expansion spring 62.

For the release of the latch elements 58 from the folded arms there is provided the release control cable 63 which has at its outer end the four terminal extensions 63a, each of which is connected with a latch element 58. The cable 63 passes through the two tubes 20 and 28 and in the vicinity of the transverse center of the cargo carrying receptacle 10 the tubes are provided with lateral openings 20a and 28a respectively through which the other end of the cable 63 passes and such end is extended through a suitable opening in the body 10 and carries on its outer end a means for connecting it with a shear pin which will be secured to the projectile carrying air plane whereby, when the projectile is released a sufficiently strong pull will be applied to the cable 63 before the shear pin gives way, to pull the latch elements 58 against the springs 62 for the release of the folded arms 50.

When the arms 50 are released the spring 61 will force the housing shell sections 41a outwardly, swinging the same on their pivots 46 as previously set forth.

Since the connection of the inner link 51 of each arm with the adjacent hinge blade 36, is radially outwardly of the pivot 37 for the adjacent rocket it will be seen that when the housing sections are forced outwardly and following such extension of the housing sections or drag fins, are loads on the fins will effect the swinging of the rockets about their pivot points 37 until the rockets are disposed at an angle of approximately 10° relative to the center line of the projectile whereupon they will be stopped by the following mechanism.

Encircling the tube 20 forwardly of the rockets and fins is a circular bullet nose shaped shield 64 which opens rearwardly toward the nozzles of the rockets and which has an overall diameter sufficient to cover the rocket nozzles when the rockets are in folded position against the tube 20 as shown in Figure 3. The edge or rim 65 of the shield 64 is in close proximity to the rocket nozzles and the shield is reinforced at such rim by an inserted annulus 66 which carries four inwardly directed pivot ears 67, to each of which is pivotally connected by the pin 68, an end of a latch arm 69. Each latch arm is formed to provide, at the end adjacent to the pivot 68, the rearwardly directed bill 70 which is in the line of movement of the adjacent stop finger 40 so that when the rocket is swung outwardly as above stated such bill 70 will catch the stop finger 40 and hold the rocket in the stated angular position.

As previously stated the tube 28 is adapted to have sliding movement in and relative to the tube 20 and as shown in Figure 3 this tube 28 terminates in the tube 20 slightly rearwardly of the rim 65 of the shield 64. Adjacent to its rear end the tube 28 which constitutes the rocket disengage actuating tube, carries the four slotted pairs of tabs 71 and the inner end of each latch arm 69 is positioned between a pair of tabs and carries a pin 72 which slidably engages in the slots 71a of the tabs.

The tube 20 is provided with suitable longitudinal slots 73 for the extension laterally therethrough of the pairs of tabs 71, the tabs being, of course, enclosed within the shield 64. During the time that the rockets are in closed or folded position against the tube 20 and also while they are in the extended position as shown in Figure 6, where the stop fingers 40 engage the bills 70 of the latch arms, the pairs of tabs will be located in the forward ends of their respective slots 73. After the projectile strikes the ground the actuating tube 28 will be shifted rearwardly in the tube 20 to move the slotted tabs back and thus effect the oscillation of the latch arms 69 so as to disengage the bills 70 from the stop fingers 40.

The numeral 74 designates the electric current carrying wires which are connected with the proximity fuse mechanism in the nose of the projectile and these wires extend rearwardly through the tubes 20 and 28 beyond the rear end of the tube 28 where they pass outwardly through openings 75 and are connected with the rocket ignitors located within the rocket shells and conventionally illustrated and designated 76.

While different numbers of rocket units might be employed it is preferred that four be used as here illustrated and it is also preferred that rockets of the solid bi-propellant type be used, although, it is understood that the invention is not restricted in this connection. Such rockets are commonly employed in Jato units and are relatively inexpensive and are reliable for use in a device of the kind herein set forth.

Since it is desirable that a device of the character herein described, when used in warfare, be made as inconspicuous as possible it is contemplated to use a suitable smokeless propellant in the rockets in place of the propellants at present employed which emit large volumes of smoke.

In the use of the rocket arrested supply vehicle or projectile it will be understood that when the projectile is suspended by suitable release mechanism carried by an airplane or other aircraft the release control cable 63 will be coupled by a shear pin, not shown, to a suitable fixed part of the aircraft as previously stated and the rocket encasing housing shell will be completely closed with the rockets in position against the tube 20 as illustrated in Figure 3.

In Figure 2 there are illustrated the several positions of the falling projectile, wherein the altered positions of the drag and rocket assembly as diagrammatically illustrated for different altitudes.

Position A in Figure 2 shows the projectile at the time of launching, at which time the fins are in closed carrying position.

As previously stated, as the projectile leaves the airplane or other carrier the release control cable is pulled to shift the latches 58 from engagement with the folded arms 50 whereupon the actuating springs 61 will exert outward thrust to open the arms and thus force the drag fin sections to swing outwardly on the pivots 46. Position B shows the drag fins in open, braking position.

As previously set forth when the fins swing outwardly the air loads on the fins will effect the outward swinging of the rockets until they are at approximately 10° angle relative to the center line of the projectile where they will be held by engagement of the stop fingers 40 with the bills of the latch arms 69.

When the projectile reaches the predetermined altitude for which the proximity fuse has been set to ignite the rockets, the fuse will be activated and the rockets will be ignited to discharge forwardly as indicated at position C. The forward firing of the rockets will retard the descent of the projectile to the desired landing speed which with rockets of the character stated would be in the neighborhood of five miles per hour at the moment of impact upon the ground, for a rocket having an overall weight of about 650 pounds.

It is calculated that the rocket charges will be exhausted between the time of ignition and the moment of contact with the ground. However, in the event that this is not the case provision is made for shifting the rockets laterally or to an outwardly directed position for the accomplishment of two objects which are, first, to prevent the rocket reaction from reversing the movement of the projectile and second, to remove the rocket blast from the vicinity of the load carrying vehicle.

Position D shows the manner in which the rockets and the drag brakes will be shifted when the projectile strikes the ground. This is accomplished by the rearward shifting of the actuating tube 28 in the manner previously stated to disengage the bills 70 of the latch arms from the stop fingers of the rockets so that the thrust of the rockets themselves will cause them to swing outwardly on the pivots 37 until such swinging action is checked by the engagement of the heel 38 of the hinge blade 36 with the sleeve 33. The four rockets will then be positioned to discharge in four different directions so that the opposing forces of their blasts will maintain the load carrying body at the place where it strikes the ground.

From the foregoing it is believed that it will be apparent that there is provided by the present invention a highly efficient means of dropping loads from high altitude whereby such loads can be accurately directed to a desired location and can be landed at such location without damage. This is of particular importance where the pay load may be in the nature of food or medical supplies for troops or other persons stranded in locations which may otherwise be temporarily inaccessible.

It will also be apparent that because of the novel means employed for checking the descent of the projectile as it approaches the earth, the projectile can be dropped at high speed and effectively checked so that the contents of the carrying body will not be destroyed on striking the ground and the possibility of the projectile being detected and destroyed by enemy action before it reaches the ground is reduced to a minimum.

I claim:

1. In a load carrier designed to be dropped from a high altitude, a load carrying body having a front and rear end, a drag brake means connected with the rear end, rocket means carried at said rear end for delivering a forwardly directed thrust when energized, means for energizing the rocket means at a predetermined altitude, said drag brake means comprising a plurality of longitudinally elongate fins disposed about the longitudinal axis of the body, pivot means supporting the fins for swinging outwardly from said axis, releasable means for securing the fins in an operative position, means for releasing said releasable means to free the fins for outward swinging, and means for urging outward swinging of the released fins, said drag brake means further comprising a plurality of housing sections to each of which a fin is joined, said housing sections having a joined relation when the fins are in said inoperative position providing a shielding enclosure for said rocket means.

2. In a load carrier designed to be dropped from a high altitude, a load carrying body having a front and rear end, a rearwardly extension tension member connected with the body, a plurality of rocket units pivoted to said member to swing from a parallel, forwardly directed position to an angular forwardly directed position relative to said member, a housing shell encasing said units and longitudinally divided in a number of drag brake forming sections, a pivot coupling between each section and the forward portion of a rocket on which the section swings laterally, releasable means holding said sections against outward swinging of the rockets, and means for igniting the rockets when they are in their outward swung position when the carrier is at a predetermined altitude.

3. The invention as set forth in claim 2, wherein the last stated means comprises a ground proximity fuse.

4. The invention as set forth in claim 2, wherein the means limiting the outward swinging of said sections comprises folded articulate arms pivotally connected between the rear ends of the sections and the adjacent pivoted rear ends of the rockets whereby air drag on the outswung sections functions to swing the rockets to said angular position.

5. The invention as set forth in claim 2, with means operated by and upon impact of the body with the ground for retracting the said means limiting the outward swinging of the rockets permitting the rockets to swing farther out to a position approaching a right angular relation with the tension member.

6. In a load carrier designed to be dropped from a high altitude, a load carrying body, an elongate tension tube extending through the body to the front end and extending a substantial distance to the rear thereof, a ground proximity fuse at the front end of the body, a plurality of elongate rocket units clustered about the rear end of the tube in parallel relation therewith to discharge forwardly, pivot connecting means between the rear ends of said units and the tube whereby the units may swing laterally, electric current conductors extending from the fuse through the tube to igniters in the rocket units, elongate drag brake elements pivotally supported at the outside of said rocket cluster to swing outward to an angular position with respect to the tube, spring means for initiating the outward swing of the brake elements, means releasably holding the brake elements against the action of said spring means, means operatively coupling the brake elements and rocket units whereby air drag on the outswung brake elements effects the lateral swinging of the rocket units to an angular position relative to the tube, and means for latching the rocket units in the angular position.

7. The invention as set forth in claim 6, wherein said latching means comprises interengaging latch arms and latch fingers, the fingers being carried by the rocket units, and a shiftable element within said tube connected with said latch arms to move the same to finger releasing position when moved in one direction, said shiftable element being actuated by and upon impact of the forward end of the load carrying body with the ground.

8. In a load carrier designed to be dropped from a high altitude, a load carrying elongate body having a front and a rear end, a plurality of elongate rocket units grouped in substantially parallel relation around the central longitudinal axis of the body adjacent to the rear end thereof and directed forwardly, means pivotally coupling said units with the body for swinging movement from said parallel relation to angular forwardly directed positions relative to said axis, a plurality of elongate drag brake members disposed in parallel relation with and around said units, means pivotally mounting the forward ends of said drag brake members for the outward swinging of the rear ends thereof away from the units, means releasably holding the drag members against outward swinging, means for releasing said holding means, an operative coupling between the drag brake members and the forward ends of said units for effecting outward swinging of the units by and upon outward swinging of the drag brake members, and means for igniting the rocket units when they are in their outward swung position when the carrier is at a predetermined altitude.

9. In a load carrier designed to be dropped from a high altitude, a load carrying body having a front and rear end, a rigid drag brake means connected with the rear end, rocket means movably supported on said rear end for disposition in a position for delivering a forwardly and laterally directed thrust when energized, means for moving the rocket means to said position during the dropping of the rocket, and means for energizing the rocket means at a predetermined altitude.

10. The invention as set forth in claim 9, wherein said drag means is shiftable from an inoperative to an operative position, and said rocket moving means being actuated by the shifting of the drag means, and means for shifting said drag means into operative position immediately following the release of the carrier for dropping.

11. The invention as set forth in claim 9, wherein said drag means comprises a plurality of longitudinally elongate fins disposed about the longitudinal axis of the body, pivot means supporting the fins for swinging outwardly from said axis, releasable means for securing the fins in an inoperative position, means for releasing said releasable means to free the fins for outward swinging, and means for urging outward swinging of the released fins.

References Cited in the file of this patent

UNITED STATES PATENTS

| Number | Name | Date |
|---|---|---|
| 2,255,245 | Ferrel | Sept. 9, 1941 |
| 2,403,567 | Wales | July 9, 1946 |
| 2,440,293 | Stanley | Apr. 27, 1948 |
| 2,539,643 | Smythe | Jan. 30, 1951 |
| 2,560,445 | Jackson | July 10, 1951 |